Feb. 6, 1945.    M. S. MOSKEY    2,368,721
MOLD FOR FORMING ARTIFICIAL TEETH
Filed March 20, 1942    2 Sheets-Sheet 1
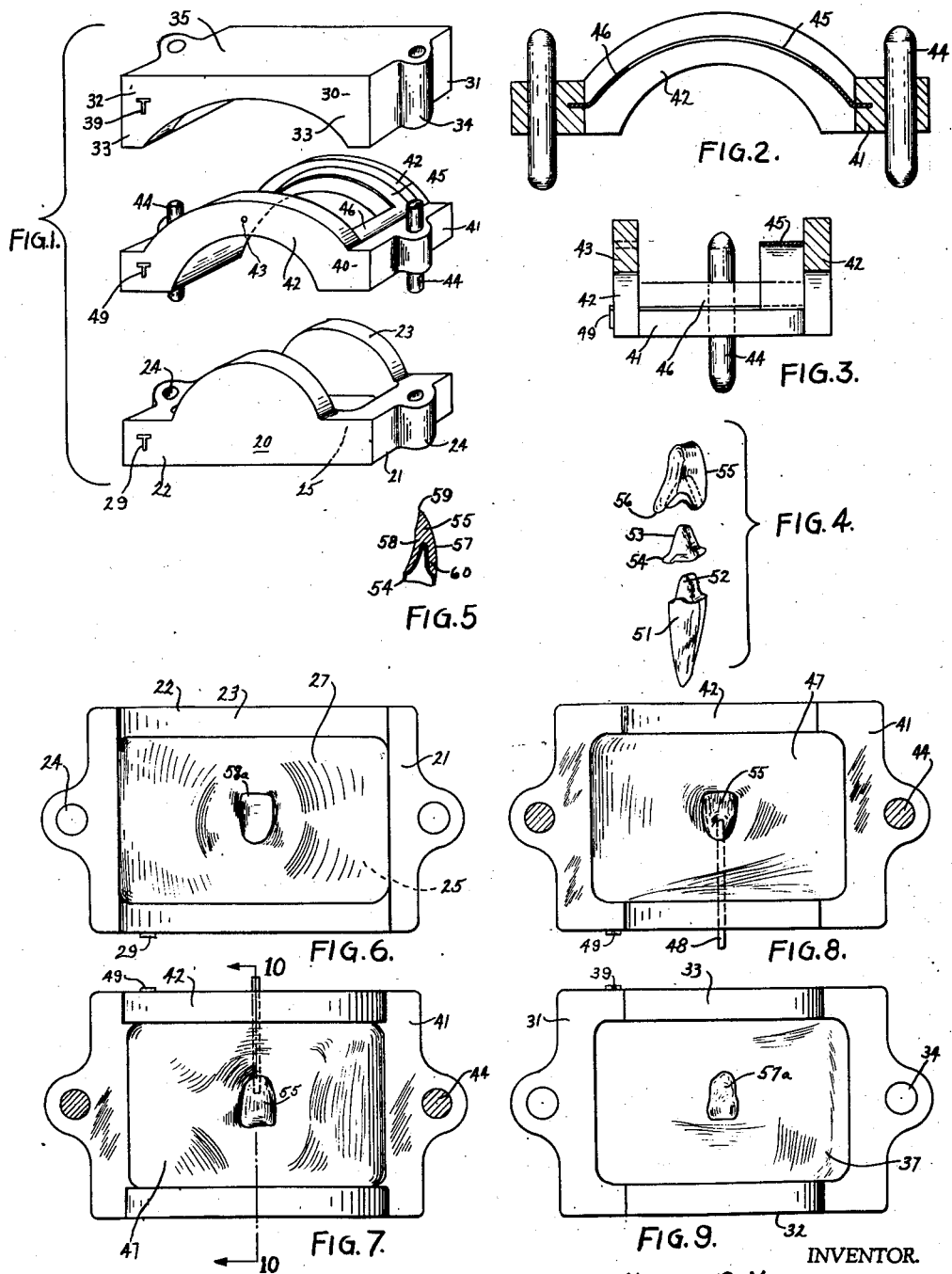
INVENTOR.
Moskos S. Moskey.

Feb. 6, 1945.  M. S. MOSKEY  2,368,721
MOLD FOR FORMING ARTIFICIAL TEETH
Filed March 20, 1942  2 Sheets-Sheet 2

INVENTOR.
MOSKOS S. MOSKEY.
BY
Morton S. Brockman

Patented Feb. 6, 1945

2,368,721

UNITED STATES PATENT OFFICE 2,368,721

MOLD FOR FORMING ARTIFICIAL TEETH

Moskos S. Moskey, Lakewood, Ohio

Application March 20, 1942, Serial No. 435,516

3 Claims. (Cl. 18—34.1)

This invention relates to dentistry and particularly to an improved type of mold or flask and to the process employing same, wherein dental crowns or bridges may be reproduced with a perfection and an exactness heretofore never attained and which artificial reproductions simulate natural teeth to a degree greater than heretofore possible.

This is the parent application of the corresponding divisional application, Serial No. 546,843, filed by me on July 27, 1944, and titled "Mold for forming artificial teeth and process therefor."

As conducive to a clearer understanding of these inventions, it may be well to point out here that in the manufacturing of artificial teeth according to the prior art, a two piece mold was used and that when packing such mold with the plastic material, the technician worked from the surface of the mold to the center of the hollow thereof. In other words, the artificial member was constructed in stages which were in reverse of a logical order of assembly or development. To further elucidate this point, attention is called to the fact that the prior art molds divided the tooth member longitudinally in two parts, that is, the labial side was formed in one-half of the mold, the lingual side was formed in the other half and the two halves were joined together. Therefore, by filling each half separately in that manner the material was applied from the visible outer surface of the artificial member inwardly to the invisible central mass thereof. By these earlier methods, it was not possible to see how the surface of the tooth would finally appear before it was finished. The technician could only guess as to the final outcome for the reason that he could not get a proper view of the outer surface of the article during its build-up before it was completed.

None of the earlier inventions permitted the technician to work on the artificial member at different stages of its curing or setting period. This necessitated, at the beginning of the manufacture, the insertion of various colored slips of plastic pieces to cause the ultimate simulation of natural tooth stains, cracks or similar blemishes. The outcome of such procedure is highly speculative and the percentage of rejections or discards is quite high.

In the earlier art, no attempts were made to faithfully reproduce the lingual side of the tooth to the same degree as the labial side was reproduced. The prior devices and technique do not make possible the commercial reproduction of the lingual side of the tooth, with the result that the lingual side had by contrast a distinctly artificial appearance.

It is therefore the primary object of this invention to provide a flask which facilitates the making of artificial teeth members easier, quicker and which members more nearly resemble natural teeth.

Another object of this invention is to provide a systematic process for the packing of such flask and mold therein with thermoplastic plastic materials or acrylics which accomplish the aforementioned result.

A further object of this invention is to provide a method for building-up artificial teeth in certain steps or stages so that all of the optical characteristics of a natural tooth may be better reproduced.

A still further object is to permit the construction or gradual build-up in a multi-part mold of an artificial tooth or other article from the inner central mass to the outer exposed surface thereof.

Still another object is to provide a three-piece separable dental mold for the method referred to and which mold has better compression characteristics than the two-piece molds heretofore used.

These and other objects and features of the invention will become apparent from a study of the following description and claims together with the accompanying drawings in which like parts are designated by like reference characters and wherein:

Figure 1 is an expanded perspective view of a flask made in accordance with this invention;

Figure 2 is a longitudinal cross-section of the middle element of the flask shown in Figure 1;

Figure 3 is a lateral cross-section of the same element of the aforesaid flask;

Figure 4 is an expanded perspective view of the wax model, the platinum cap and the amalgam matrix used in the process for reproducing a dental crown;

Figure 5 is a vertical cross-section of the above mentioned wax model alone;

Figure 6 is a plan view of the bottom tray of the flask with lingual impression or matrix therein;

Figure 7 is a top plan view of the intermediate section of the same flask with the wax model therein and particularly showing the labial side or part thereof;

Figure 8 is a bottom view of the intermediate section of the same flask showing the lingual side of the wax model therein;

Figure 9 is a plan view of the top tray of the same flask inverted and showing labial impression or matrix therein;

Figure 13:
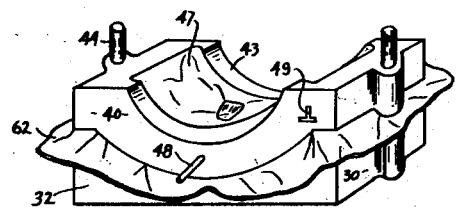
Figure 14:
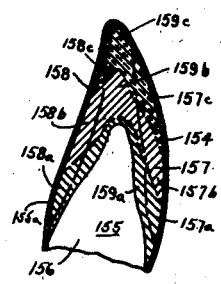

Figure 13 is a perspective view of the top tray and the intermediate section assembled with a sheet of wet Cellophane therebetween and ready for packing the lingual side of the crown; and Figure 14 is an enlarged vertical sectional view of a finished specimen crown showing the blended materials in the lingual, the labial and the intermediate parts of the crown and particularly in the gingival, medial and incisal parts thereof.

The flask

In the drawings and particularly in Figures 1, 2 and 3 thereof, there is illustrated a metal flask composed of three primary elements. There is, first, the drag or bottom tray 20; second, the cope or inverted top tray 30 and lastly the intermediate or middle section 40. Each of these parts will be described in detail and in the order just set forth.

The bottom tray 20 is a rather substantial metal piece which has a flat bottom part 25 and from which there extends upwardly two end walls 21 and the two side walls 22 forming a rectangular pan or tray-like member. Each of the two side walls 22 have extension wall portions 23 thereon which have curved top edges. Each of the end walls 21 is provided with a vertical hole 24 which receives a certain connecting pin 44 hereinafter described. The bottom tray 20 may be for most purposes approximately three inches long and about two inches wide and should be of a heavy durable construction in order to withstand the pressure applied thereto when the assembled flask is subsequently put into a press or between suitable clamps.

The top or inverted tray 30 is substantially the same as the bottom tray 20. It too, has a top portion 35 from which there depends two end walls 31 and two side walls 32. The side walls 32 instead of having extended portions like the bottom tray 20 have recessed portions 33 thereon. The two end walls 31 similarly have holes 34 therein for receiving the aforementioned connecting pins 44.

The middle section 40 of the flask is hollow, that is, it does not have either top or bottom parts which are analogous to the elements 25 or 35. The middle section consists of two end walls 41 and two curved side walls 42 connected together to form an open rectangular frame. The side walls 42 are however, curved. The lower edges thereof are recessed to snugly engage the raised extensions 23 of the bottom tray member and the top edges thereof are raised to fit the recessed portions 33 of the inverted tray member. Each of the end walls 41 are provided with a pair of extending and a pair of depending aligned pins 44 which pins engage the holes 24 and 34 of the aforesaid bottom and top trays 20 and 30 respectively in the manner shown in the drawings.

The two end walls 41 and one of the side walls 42 of the middle section 40 are provided with inwardly extending portions referred to herein as flanges 45 and 46. The flanges 46 on the two end walls are attached thereto at about the middle of the wall and extend laterally inwardly and upwardly at an angle which approximately corresponds to the curvature of the adjacent side walls 42. The flange 45 which is on the side wall 43 is curved longitudinally to correspond with the curvature of the side wall, extends inwardly a short distance and joins the two flanges 46.

The opposite curved side wall 42, the one that does not have a flange thereon, is provided with a small lateral hole 43 which will receive a small dowel or guide pin 48 hereinafter mentioned. This hole 43 is substantially in line with the aforesaid flange 45 on the side wall 43.

The aforesaid top tray and section 30 and 40, like the bottom tray 20, are substantially made of durable material and when assembled completely register and are able to receive a considerable pressure in a clamp or press, and also, when so assembled form a closed box-like structure.

The center section of the flask in which the wax pattern is invested, is in reality an open frame which permits the operator to apply the gingival, middle third and incisal plastic as precisely as though the case were mounted upon an open model. The outside sections of the flask are used only for compression and as a lingual and labial counter-die to register and mold the material to the desired form.

For the purpose of quickly identifying the parts of each flask and so that the sections may be fitted together easily and in their proper order, each section is marked with indicia, such as by the letter "T" indicated by the characters 29, 39 and 49 of the respective elements 20, 30 and 40. These identification marks 29, 39 and 49 only appear once on each section of the flask and when the sections are assembled so that the marks appear in an ordinary arrangement, such as one above the other, the technician instantly knows that the molds are in proper order. This marking is important, particularly when many flasks are used, as the time usually taken to examine each part to see that it fits properly and to try each section to see that the parts of the mold are related, is saved.

The technique

The technique of tooth preparation with the previously described flask is substantially the same as for conventional porcelain procedure. That is, a stone or an amalgam die 51 having a model 52 of the tooth stump thereon is prepared over which a platinum matrix 53 of about one-thousandth of an inch thick is swaged. A small shoulder should be formed on the portion of the matrix 53 which is adjacent to the gingival portion 54 of the tooth. The wax crown 55 and matrix 53 are then removed from the model 51 and together inserted in the flask, as directed in the following procedure.

A mixture of stone and plaster 47 is prepared which has a thicker-than-cream consistency. The wax pattern is filled with some of the mixture 47 while still in a plastic state and is set aside temporarily. A small piece of wire or a nail herein called a guide pin 48 is inserted through the opening 43 in the side wall 42 of the middle section of the flask and the wax model 55 of the tooth is mounted thereon. If more than one tooth is to be processed then a separate guide pin 48 should be inserted for each tooth or case. While the drawings show only one hole 43 in the side wall 42, it should be understood that many more may be drilled if the nature of the work requires them.

The investment 47 is built-up from the pin side of the center section 40 of the flask to a little short of the inner end of the pin 48. The wax model 55 is then mounted on the inner end of the pin 48 so that it is directly in the center of the flask, and so that the lingual side 58 of the model faces the concave or downward side of the section 40 and so that the labial side 57 thereof is upward. The plastic mixture 47 inside the hollow core of the matrix 53 holds it on the guide pin. A small piece of sticky wax instead of the plaster may be used to mount the matrix and the wax model 55 on the guide pin 48 if desired. The remaining investment is then built-up from the two end walls 41 and opposite curved wall 42 using the flanges 45 and 46 as support for the material and as guides for estimating the thickness of the part of the material that surrounds the model 55 and touches it only at the incisal, mesial, distal and gingival aprons thereof; thus leaving the lingual and labial surfaces thereof almost entirely exposed. The investment 47 touches the model 55 and attaches thereto at a border of approximately one-thirty-second to one-sixteenth of an inch wide.

After the investment 47 has set, a separating medium such as sodium silicate or water glass is applied to both sides of the invested center section 40 of the flask. Next, a little of the soft plastic investment is carefully painted or spread over the exposed lingual and labial surfaces of the model 55 itself. The two bottom and top trays 20 and 30 are filled with the investment material 27 and 37 respectively, are assembly and closed gently allowing excess materials to come out. The closed flask is then allowed to set in a suitable press or a C-clamp until the investment material in the three parts of the flask is thoroughly hardened.

After the investment material 27, 37 and 47 has set and hardened the top and bottom trays 20 and 30 are separated from the middle section 40 and the wax model 55 is removed therefrom by boiling the middle section and contents thereof in water for about ten minutes. This then leaves the platinum matrix 53 exposed in the opening 55a of the section 40. Feather edges and rough spots on the investment 47 are carefully carved away and the pattern gently smoothed out in the conventional manner. The flask sections are allowed to cool completely before the plastic material which forms the artificial tooth is inserted therein.

Figure 10:
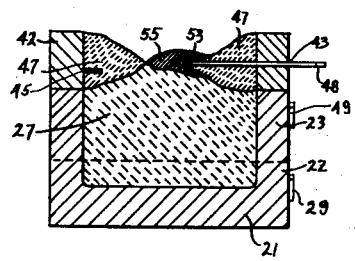
Figure 10 is a vertical lateral cross-section of combined bottom tray and intermediate section showing the wax model, the platinum cap and the guide pin used for supporting the model and cap in the soft investment material, the view being a section along the line and in the direction of the arrows 10—10 of the Figure 7.
Figure 11:
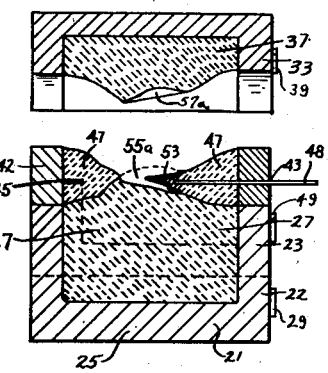
Figure 11 is a vertical cross-sectional view of the mold partly expanded with wax model removed and just showing the platinum cap and the aforesaid guide pin.
Figure 12:
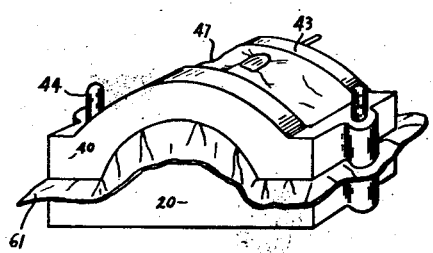
Figure 12 is a perspective view of the bottom tray and the intermediate section assembled with a sheet of wet Cellophane therebetween and ready for packing the labial side of the crown.

Before packing the acrylic the walls and edges of the mold should be painted with more sodium silicate to assure maximum smoothness, hardness and strength thereof. When dry a piece of moistened Cellophane 61 is then placed between the lingual section or tray 20 of the flask and the middle section 40 as shown in the Fig. 12. This leaves the labial and the middle portions 57a and 55a of the mold exposed for packing.

The exposed portion of the matrix 53 is coated with the resin in a manner similar to indication of character 159a in the Fig. 14. The middle portion 159b of the tooth is next laid with the plastic acrylic which is followed with a portion of material 159c of the incisal edge. The acrylic 159c may be more translucent than the others. The gingival portion 157a is applied to about the height of the matrix 53 and tapers towards the incisal. The middle portion 157b is also tapered to the incisal. The remaining surface is then filled with an incisal third mix 157c. The aforesaid resins 159a, b and c and 157a, b and c may be of different patterns, colors and translucencies and should be carefully laid and gradually blended so as to resemble a natural tooth or simulate the one to be matched or duplicated. Caution should be used so as to not overbuild the labial side of the tooth inasmuch as the lingual side must also be packed in a somewhat similar manner.

After the material has been applied labially as aforesaid, place a second piece of dampened Cellophane 62 on the surface of the labial section or inverted tray 30 of the flask and place the middle section 40 and the bottom tray 20 over it using finger pressure only to bring the sections together. The bottom tray 20 or lingual section is removed together with the Cellophane 61, thus exposing the lingual portion of the mold for packing.

The lingual area is then packed in the same manner as the labial; that is, the resins 158a, 158b and 158c are laid and blended as needed, except that a little more material is used to obtain greater bulk and so that better compression of the materials is obtained. Upon completion of the packing the dampened Cellophane 61 is again applied to the lingual section of the flask as aforesaid. The three parts of the flask are then assembled and locked in a portable clamp and prepared for a test pack. The clamped flask is then placed in boiling water for about three minutes or for a duration of time which partially cures the thermoplastic resin, and then is opened for corrections. Excess material may be removed from the lingual side. Special stains or coloring may then be applied to the exposed lingual and labial surfaces of the tooth. The middle section may be held up to the light or held near a darkened cavity practically simulating an oral cavity so that the translucency of the incisal edge may be checked. If desired, the entire incisal may be cut out and repacked with a more or less translucent mix if needed. Repacking, however, should be done from the labial side first and following the same procedure as described above. Next put moist Cellophane between the sections and tightly close the flask with full compression in a suitable clamp or press. Cure the plastic resin for at least one hour. After which it should be thoroughly cooled in cold water before being opened.

After the flask sections 20, 30 and 40 are opened and separated the guide pin 48 is removed from the middle section. This may be easily done with a pairs of pliers. The investment material 47 is carefully broken away from around the tooth and the crown is taken from the flask. The platinum matrix 53 is peeled from inside the recess 56 of the crown so that it may be set up on the original die 51 for finishing and polishing in the conventional manner.

If desired, a thin coat of transparent plastic material may be applied to the lingual and labial surfaces and the edges of the mold before the acrylic materials are packed therein. This uniformly spread, transparent material indicated in Fig. 14 by the character 155a is like the enamel coating on a natural tooth and tends to create an optical effect which is more natural than prior art members and is particularly noticeable and admired when viewed under artificial light.

For the purpose of simplicity, the technique as described and illustrated herein is for a simple jacket crown. However, it should be understood that bridges and other types of artificial teeth may be constructed in much the same manner. Persons skilled in the art may readily adopt the foregoing technique to that of the preparation of bridges, for example. However, it has been found that in the case of bridge work, best results are obtained if a proper reinforcing bar is used to connect whatever abutments are used in the case.

In bridgework involving two or more teeth, the reinforcing bar should be positioned midway between the tissue and incisal and should be shaped to conform with the contour of the gum line. After the bar is soldered to the abutments, the skeleton is placed on the model and the wax cone or dummy is carved. The wax form may then be removed and tried in the mouth for bite and fit and when found satisfactory the wax bridge form is invested in the flask in the same way as for the single jacket crown heretofore described, using as many guide pins 48 as are necessary to hold it in place while the investment material is packed around it. The labial and lingual sides of the pattern are thus exposed the same way.

It will now be clear that there is provided by these inventions a mold for forming artificial teeth and a process therefore which accomplishes the objects of the invention. While the inventions have been disclosed in their preferred form, it is to be understood that the embodiment of the inventions as described and illustrated herein is not to be considered in a limited sense as there may be other forms or modifications of the invention which should also be considered to be within the scope of the appended claims.

I claim:

1. A dental mold, comprising in combination, a first tray member having a matrix therein of the labial portion of a crown, a second tray member having a matrix therein of the lingual portion of the crown, an intermediate section having a matrix therein of the peripheral portion of the crown, and a means for separably uniting the said section and members together thereby registering the said matrices in a manner whereby an impression of a whole crown is formed.

2. A dental mold for forming jacket crowns and the like, comprising in combination a first tray member having a matrix therein of the labial portion of a crown, an intermediate section separably mounted on the first tray member and having a matrix therein of the edge and side portions of the crown and including a configuration of the gingival portion of the crown, and a second tray member separably mounted on the intermediate section and having a matrix therein of the lingual portion of the crown, the said matrices and configuration being in register when the said section and members are assembled and forming thereby an impression of a complete dental crown.

3. A dental mold for forming jacket crowns and the like, comprising in combination, a first tray member having a matrix therein of the labial portion of a crown, an intermediate section separably mounted on the first tray member and having a matrix therein of the edge, side and gingival portions of the crown, and a second tray member separably mounted on the intermediate section and having a matrix therein of the lingual portion of the crown, the said matrices forming an impression of a complete dental crown.

MOSKOS S. MOSKEY.